United States Patent [19]

Maus et al.

[11] Patent Number: 5,686,164
[45] Date of Patent: Nov. 11, 1997

[54] ELECTRICAL INSULATION OF STRUCTURES IN A HONEYCOMB BODY IN PARTICULAR AN ELECTRICALLY HEATABLE CATALYST CARRIER BODY

[75] Inventors: Wolfgang Maus; Rolf Brück, both of Bergisch Gladbach, Germany

[73] Assignee: Emitec Gesellschaft fuer Emissionstechnologie mbH, Lohmar, Germany

[21] Appl. No.: 208,012

[22] Filed: Mar. 9, 1994

Related U.S. Application Data

[63] Continuation of PCT/EP92/02008 Sep. 1, 1992.

[30] Foreign Application Priority Data

Sep. 9, 1991 [DE] Germany ............... 41 29 894.2

[51] Int. Cl.[6] ............................................. B32B 3/12
[52] U.S. Cl. .................... 428/116; 428/188; 428/593; 502/527
[58] Field of Search ........................ 428/116, 188, 428/593; 502/527; 493/966

[56] References Cited

U.S. PATENT DOCUMENTS

| | | |
|---|---|---|
| 3,966,645 | 6/1976 | Cairns et al. ............ 428/116 X |
| 4,713,361 | 12/1987 | Maus ..................... 428/116 X |
| 4,946,822 | 8/1990 | Swars .................... 428/593 |
| 5,045,403 | 9/1991 | Maus et al. ............. 428/593 |
| 5,070,694 | 12/1991 | Whittenberger ....... 422/174 X |
| 5,094,074 | 3/1992 | Nishizawa et al. ..... 428/116 X |
| 5,139,844 | 8/1992 | Maus et al. ............. 428/116 |
| 5,254,840 | 10/1993 | Thompson .............. 428/116 X |
| 5,288,470 | 2/1994 | Cornelison et al. .... 428/116 X |
| 5,322,672 | 6/1994 | Breuer et al. .......... 422/180 |
| 5,328,774 | 7/1994 | Maus et al. ............. 428/593 |
| 5,464,679 | 11/1995 | Maus et al. ............. 428/188 X |
| 5,468,455 | 11/1995 | Bruck ..................... 428/593 X |
| 5,608,968 | 3/1997 | Maus et al. ............. 502/527 X |

*Primary Examiner*—Henry F. Epstein
*Attorney, Agent, or Firm*—Herbert L. Lerner; Laurence A. Greenberg

[57] ABSTRACT

A honeycomb body, in particular a catalyst carrier body, includes at least partially structured sheet-metal layers forming a multiplicity of channels through which a fluid can flow. An electrically insulating intermediate layer has at least two sheet-metal layers being mechanically clamped together and an insulating layer electrically insulating the at least two sheet-metal layers from one another.

14 Claims, 3 Drawing Sheets

ELECTRICAL INSULATION OF
STRUCTURES IN A HONEYCOMB BODY IN
PARTICULAR AN ELECTRICALLY
HEATABLE CATALYST CARRIER BODY

CROSS-REFERENCE TO RELATED
APPLICATION

This is a continuation under 35 U.S.C. §120 of international application PCT/EP92/02008, filed Sep. 1, 1992, and designating the United States.

BACKGROUND OF THE INVENTION

FIELD OF THE INVENTION

The present invention relates to a honeycomb body, in particular an electrically heatable catalyst carrier body for motor vehicles, having structures and electrically insulating intermediate layers between the structures.

In order to reduce pollutant emissions from internal combustion engines, particularly in motor vehicles, catalytic converters are used. In particular, electrically heatable catalytic converters are used so as to reduce pollutant emissions even in a cold-starting phase. Various embodiments of electrically heatable honeycomb bodies are described, for instance, in International Application WO 89/10471, corresponding to allowed U.S. application Ser. No. 604,199, filed Oct. 25, 1990 now U.S. Pat. No. 5,322,672. In order to achieve a suitable resistance, electrically heatable honeycomb bodies are equipped with electrically insulating intermediate layers between which the electric current takes a defined course. In motor vehicle exhaust systems, such electrically heatable honeycomb bodies are also exposed to considerable mechanical strains, particularly alternating thermal strains. The electrically insulating intermediate layers or gaps that were previously known are generally unable to absorb major mechanical tensile forces, which must be considered a limitation in the construction and manufacture of such honeycomb bodies.

Honeycomb bodies that have one or more reinforced sheet-metal layers are also already known from International Application WO 89/07488. In particular, such reinforced layers may include a plurality of identically structured sheet-metal layers resting on one another.

A number of other models of metal honeycomb bodies are also known from the prior art, particularly spirally wound honeycomb bodies, or bodies made up of sheet-metal layers extending in approximately involute fashion.

SUMMARY OF THE INVENTION

It is accordingly an object of the invention to provide an electrical insulation of structures in a honeycomb body, in particular an electrically heatable catalyst carrier body, which overcomes the hereinafore-mentioned disadvantages of the heretofore-known devices of this general type, which can be integrated particularly simply into a production process and which in addition can absorb mechanical forces and in particular can withstand tensile forces. In that way, the construction of electrically heatable honeycomb bodies is intended to be simplified, while the mechanical load-bearing capacity is to be simultaneously increased.

With the foregoing and other objects in view there is provided, in accordance with the invention, a honeycomb body, in particular a catalyst carrier body, comprising at least partially structured sheet-metal layers forming a multiplicity of channels through which a fluid can flow; and an electrically insulating intermediate layer having at least two sheet-metal layers being mechanically clamped together and an insulating layer electrically insulating the at least two sheet-metal layers from one another.

As will be described in detail in conjunction with the drawing, two sheet-metal layers may be crimped or clamped together, despite an electrical insulation, in such a way that mechanical tensile strains are absorbed by the crimp rather than by the insulation disposed between the sheet-metal layers. Crimps or clamping connections are also possible that react especially elastically to tensile strains, and others are possible that are capable of absorbing strong tensile forces without major deformation.

In accordance with another feature of the invention, the intermediate layer is constructed in such a way that the crimped or clamped-together sheet-metal layers are formed of metal with a large surface area on both sides and thus can be joined to other sheet-metal layers on both sides by brazing or similar joining processes.

Although International Application WO 89/10471, corresponding to allowed U.S. application Ser. No. 604,199, filed Oct. 25, 1990 now U.S. Pat. No. 5,322,672, discloses sheet-metal layers with a ceramic intermediate layer that protrudes form-lockingly into one another for absorbing axial forces, nevertheless those metal sheets are not crimped or clamped, so that tensile loading can still tear their sheets apart. That is intended to be averted in the present invention, while preserving the possibility of joining the layers on both sides to adjacent sheet-metal layers. A form-locking connection is one which connects two elements together due to the shape of the elements themselves, as opposed to a force-locking connection, which locks the elements together by force external to the elements.

As is described in detail in terms of several exemplary embodiments shown in the drawing, the simplest form of the crimp or clamping connection is for one sheet-metal layer to fit around the other sheet-metal layer at the lateral edges thereof. Another, more-elastic crimp or clamping connection includes folding the sheet-metal layers around one another mutually. Forms in which the sheet-metal layers are folded around one another multiple times in a form-locking fashion or are nested in one another, are also possible.

In accordance with a further feature of the invention, there is provided one or more electrical conductors being insulated electrically from the sheet-metal layers and serving, for instance, as temperature sensors, between the crimped or clamped-together sheet-metal layers. In this way, without major additional assembly effort or expense, a linear or generally flat temperature sensor can be integrated into the honeycomb body. This is especially advantageous in heatable catalytic converters for the sake of their regulation.

In accordance with an added feature of the invention, the crimped or clamped-together sheet-metal layers are not used in the form of a smooth intermediate layer but rather as a structured and in particular corrugated intermediate layer. This provides greater flexibility of the intermediate layer than is possible with a smooth intermediate layer made up of several layers. Producing crimped or clamped-together sheet-metal layers can be done especially simply by means of rolling. The pre-folded sheet-metal layers, provided with an insulating layer, can be rolled between a pair of rollers in order to reduce the thickness of the intermediate layer. Rolling between corrugated rollers, of the familiar kind for structuring metal sheets for honeycomb bodies, can be done without any problem.

If a honeycomb body is constructed later using electrically insulating intermediate layers according to the invention, assurance must naturally be provided that the electric insulation of the crimped or clamped-together sheet-metal layers will not be bridged by adjacent structures. This can be done, for instance, by causing the crimped or clamped-together sheet-metal layers to protrude far enough on the end surface past the other sheet-metal layers of the honeycomb body to ensure that the crimp or clamping connection of one sheet-metal layer fits around the other sheet-metal layer. This reliably averts a short circuit, although it makes brazing such honeycomb bodies together at the end surfaces somewhat problematic.

Another option is therefore to shorten the other sheet-metal layers of the honeycomb body bordering on the crimped or clamped-together sheet-metal layers, far enough to ensure that the crimp or clamping connection of the one sheet-metal layer fits around the other sheet-metal layer. In that case, brazing at the end can be done as usual, and only the connection between the shortened sheet-metal layers and the intermediate layer needs to be produced separately, for instance by inlaying brazing material foils.

Moreover, as will be described in conjunction with the drawing, forms of the crimp or clamping connection also exist in which flush termination of the intermediate layer with the other sheet-metal layers is possible at the end surfaces of the honeycomb body.

In order to provide the stability of the entire honeycomb body and for the sake of a uniform production process, it is advantageous if the outer surfaces of the crimped or clamped-together sheet-metal layers are joined together by joining techniques in the same way, preferably by being hard soldered, to adjacent other sheet-metal layers, as is also the case between the other sheet-metal layers.

Other features which are considered as characteristic for the invention are set forth in the appended claims.

Although the invention is illustrated and described herein as embodied in an electrical insulation of structures in a honeycomb body, in particular an electrically heatable catalyst carrier body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
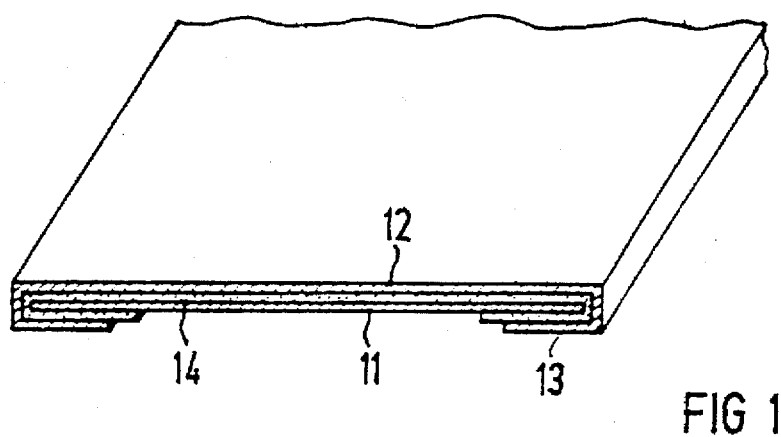
FIG. 1 is a fragmentary, diagrammatic, perspective cross-sectional view of an insulating intermediate layer according to the invention, including smooth sheet-metal layers.

Referring now to the figures of the drawing in detail and first, particularly, to FIG. 1 thereof, there is seen a cross section through the simplest embodiment of the present invention, in which a smooth sheet-metal layer 11 is separated from a smooth sheet-metal layer 12 by an insulating layer 14. Outer edges 13 of the smooth sheet-metal layer 12 together with the insulating layer 14 fit around the sheet-metal layer 11. The insulating layer 14 is intended to protrude slightly past a crimp or clamping connection provided by the outer edges 13.

Figure 2:
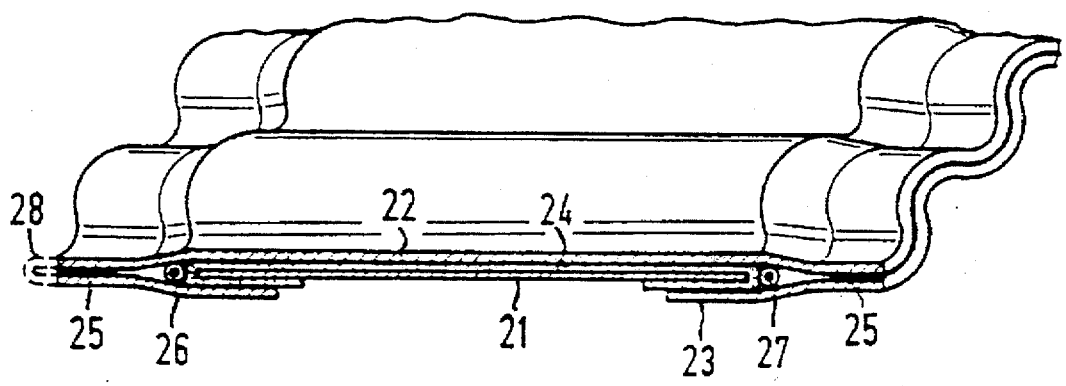
FIG. 2 is diagrammatic, perspective cross-sectional view of a corrugated intermediate layer with integrated temperature sensors.

FIG. 2 shows that intermediate layers according to the invention can also be constructed to be preferentially corrugated. Once again, a sheet-metal layer 21 is separated from another sheet-metal layer 22 by an insulating layer 24. A crimp or clamping connection between the two sheet-metal layers 21, 22 can again be made by bending over outer edges 23 of the sheet-metal layer 22, as is indicated by dashed lines in the form of a folded edge 28. However, the possibility also exists of making clamping connection 23 by brazing on additional parts. For instance, a brazing material foil 25 is inserted and rolled-in with the other parts, which then produces a firm connection in a later brazing operation. The insertion of the brazing material foil 25 may also be advantageous when the folded edges 28 are used, because sharply folded edges 28 may possibly become brittle and then cannot assure the desired function, namely of absorbing tensile forces. In the present exemplary embodiment, two jacket measuring conductors 26, 27 are integrated into the crimp or clamping connection. Precisely in the configuration shown, this can be easily be done laterally beside the sheet-metal layer 21.

Figure 3:
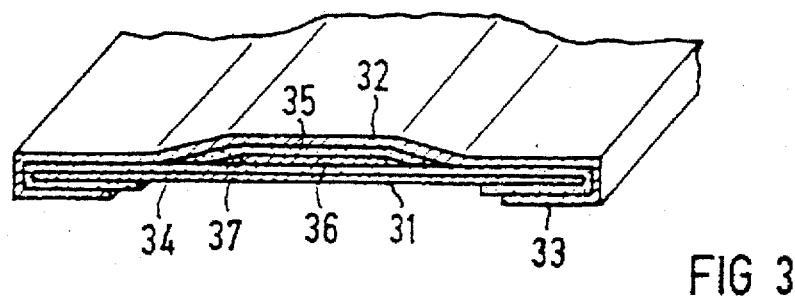
FIG. 3 is diagrammatic, perspective cross-sectional view of a smooth intermediate layer with an additional integrated conductor.

FIG. 3 shows another variant for integration of an additional electric conductor 36 between two crimped or clamped-together sheet-metal layers 31, 32. The layer 32 has an outer edge 33. In addition to an insulating layer 34 between the sheet-metal layers 31, 32, one additional insulating layer 35 is needed. Through jointly rolling-in all of the layers, the result is only a slight bulging outward of the sheet-metal layer 32, and only small unused voids 37 remain.

FIGS. 4, 5, 6 and 7 diagrammatically illustrate various forms of the crimp connection by way of examples in cross section, although the insulating layers are not shown. The drawing is not to scale either, because after the layers have been rolled together, an intermediate layer of only 0.1 to 1 mm in thickness, for instance, is the result.

Figure 4:
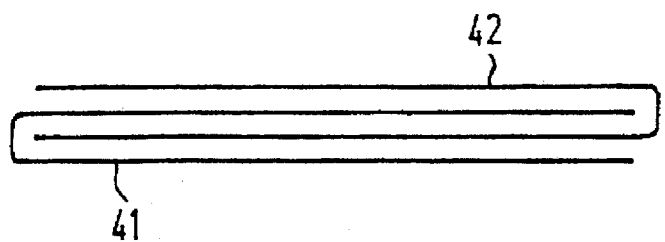
FIGS. 4, 5 and 6 are elevational views of various crimp forms.

FIG. 4 shows an elastic type of crimp or clamping connection, in which two sheet-metal layers 41, 42 are mutually folded around one another. This type of crimp or clamping connection reacts highly elastically to tension, yet the layers cannot be torn apart thereby.

Figure 5:
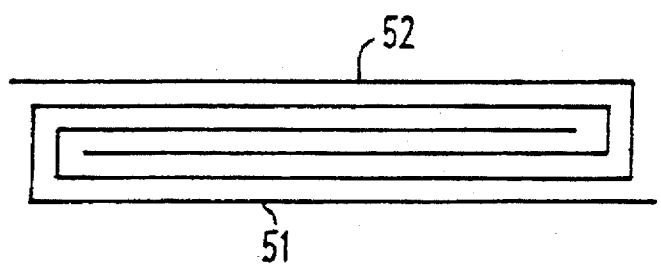

FIG. 5 shows two sheet-metal layers 51, 52, that are folded multiple times around one another. This configuration likewise reacts highly elastically to tension, but is additionally secured against parallel shifting in any direction.

Figure 6:
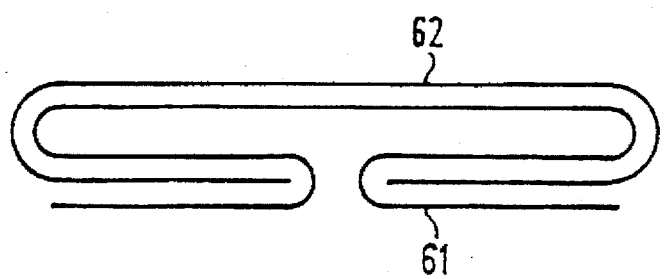

FIG. 6 shows a crimp or clamping connection in which a first sheet-metal layer 62 fits around a second sheet-metal layer 61 bent approximately in the shape of an Ω. In this configuration, which likewise reacts highly elastically to tension, both outer sides can be brazed without difficulty to adjacent sheet-metal layers, without fear of a short circuit.

Figure 7:
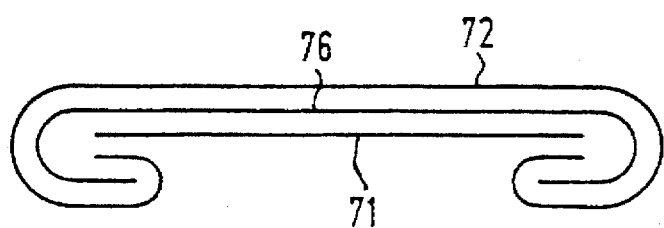
FIG. 7 is an elevational view of a crimp form with an additional integrated electrical conductor.

In FIG. 7, two sheet-metal layers 71, 72 and one additional electric conductor 76 are crimped or clamped together in a special way. First, the electric conductor 76 fits around the sheet-metal layer 71. The sheet-metal layer 72 also fits around both layers 71 and 76 jointly.

Figure 8:
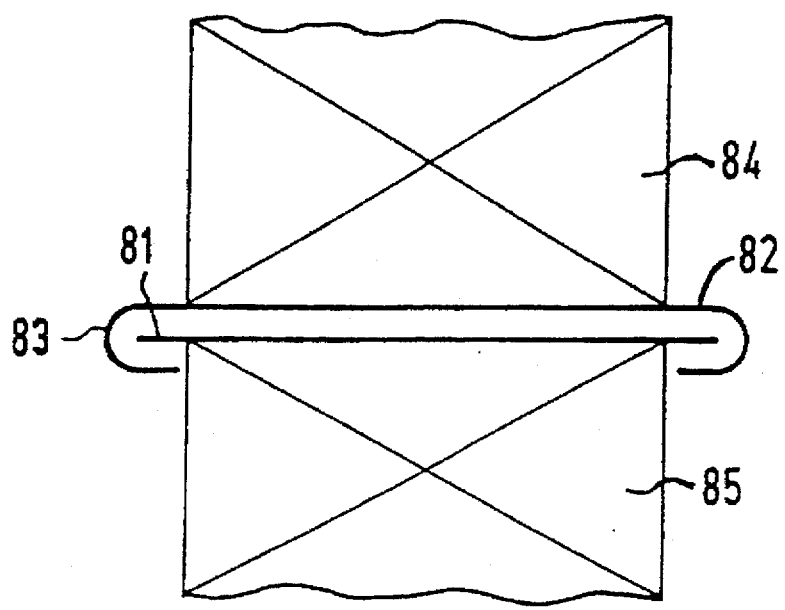
FIG. 8 is a fragmentary, longitudinal-sectional view of a binding-in of an intermediate layer protruding past end surfaces of a honeycomb body.
Figure 9:
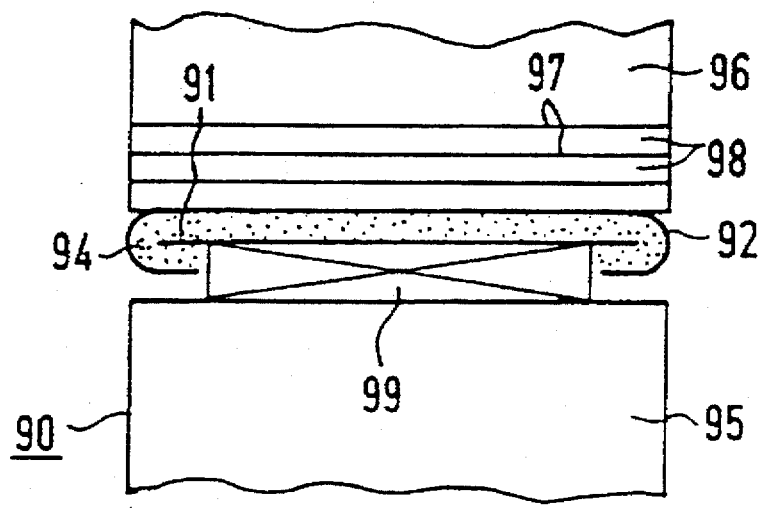
FIG. 9 is a fragmentary, longitudinal-sectional view of a binding-in of an intermediate layer not protruding past the end surfaces of a honeycomb body.

FIGS. 8 and 9 show possible ways of binding-in intermediate layers according to the invention into a honeycomb body. FIG. 8 is a diagrammatic, longitudinal section through part of a honeycomb body which shows one variant, in which an electrically insulating intermediate layer protrudes past end surfaces of the honeycomb body on both sides. Other sheet-metal layers 84, 85 of the honeycomb body are brazed onto the outside of respective sheet-metal layers 81 and 82. A crimp or clamping connection 83 protrudes beyond the end surfaces of the thus-formed honeycomb body.

FIG. 9 is a diagrammatic, longitudinal section which shows another variant for binding-in crimped or clamped-together sheet-metal layers. A honeycomb body 90 includes structured sheet-metal layers 97, which form channels 98 that allow the passage of a fluid through them, in a known manner. Various segments 95, 96 of the honeycomb body 90 are electrically insulated from one another by insulating intermediate layer 91, 92, 93, 94. The sheet-metal layer 92 is brazed directly to the other sheet-metal layers 97 of the segment 96, while a connection with the segment 95 is made through shortened adjacent sheet-metal layers 99. If the intermediate layer 91, 92, 93, 94 includes smooth sheet-metal layers, then the adjacent sheet-metal layer 99 is a shortened corrugated sheet-metal layer. If the intermediate layer itself is corrugated, then under some circumstances two shortened structured sheet-metal layers must adjoin one another, to avert a short circuit at the crimps or clamping connections 93.

It should also be noted that intermediate layers according to the invention can be produced by rolling-in practically any desired structure, in particular in the form of smooth layers, corrugated layers, obliquely corrugated layers with an arrow-shaped corrugation, etc. The incorporation of intermediate layers according to the invention into a production process can be performed in many embodiments quite similarly to the methods described in International Application WO 89/07488 and in the references cited therein. All that needs to be taken into account on occasion is that no short circuits occur in the region of the crimp or clamping connection.

The present invention is especially suitable for producing electrical insulations in electrically heatable catalyst carrier bodies for motor vehicles.

We claim:

1. A honeycomb body, comprising: at least partially structured sheet-metal layers forming a multiplicity of channels through which a fluid can flow; and an electrically insulating intermediate layer disposed between two of said sheet-metal layers, said intermediate layer including at least two sheet-metal layers being mechanically clamped together and an insulating layer electrically insulating said at least two sheet-metal layers from one another.

2. The honeycomb body according to claim 1, wherein said clamped-together sheet-metal layers together form said intermediate layer, and said intermediate layer has two sides each being formed of metal having a large surface area and being connected on both of said sides to others of said sheet-metal layers.

3. The honeycomb body according to claim 2, wherein said intermediate layer is brazed on both of said sides to others of said sheet-metal layers.

4. The honeycomb body according to claim 1, wherein said clamped-together sheet-metal layers form said electrically insulating intermediate layer, and said sheet-metal layers have subregions being clamped together for absorbing tensile forces straining said intermediate layer at said subregions and not at said insulating layer.

5. The honeycomb body according to claim 1, wherein at least one of said clamped-together sheet-metal layers and said insulating layer fit around lateral edges of others of said sheet-metal layers.

6. The honeycomb body according to claim 1, wherein said clamped-together sheet-metal layers are folded over around one another.

7. The honeycomb body according to claim 1, wherein said clamped-together sheet-metal layers are multiply folded over around one another in a form-locking manner.

8. The honeycomb body according to claim 1, which further comprises at least one electric conductor which is electrically insulated from said sheet-metal layers and disposed between said clamped-together sheet-metal layers.

9. The honeycomb body according to claim 1, wherein said clamped-together sheet-metal layers have a joint structure.

10. The honeycomb body according to claim 9, wherein said joint structure is a corrugation.

11. The honeycomb body according to claim 1, wherein said clamped-together sheet-metal layers protrude outward at end surfaces past others of said sheet-metal layers, at least enough to cause said clamping connection of one of said sheet-metal layers to fit around another of said sheet-metal layers.

12. The honeycomb body according to claim 1, wherein others of said sheet-metal layers bordering on said clamped-together sheet-metal layers are shortened enough to cause said clamping connection of one of said sheet-metal layers to fit around another of said sheet-metal layers.

13. The honeycomb body according to claim 1, wherein said clamped-together sheet-metal layers have outer surfaces being joined at least in subregions to adjacent others of said sheet-metal layers.

14. The honeycomb body according to claim 13, wherein said joining is hard soldering.

* * * * *